US012652175B2

(12) United States Patent
S et al.

(10) Patent No.: US 12,652,175 B2
(45) Date of Patent: Jun. 9, 2026

(54) REDUCING LATENCY DURING CRYPTOGRAPHIC SIGNATURE VERIFICATION

(71) Applicant: International Business Machines Corporation, Armonk, NY (US)

(72) Inventors: Akhilesh S, Bangalore (IN); Rajat Rao, Bangalore (IN); Sandeep Korrapati, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 18/651,219

(22) Filed: Apr. 30, 2024

(65) Prior Publication Data

US 2025/0337595 A1     Oct. 30, 2025

(51) Int. Cl.
| | |
|---|---|
| *H04L 9/32* | (2006.01) |
| *H04L 9/06* | (2006.01) |
| *H04L 9/30* | (2006.01) |

(52) U.S. Cl.
CPC .......... *H04L 9/3247* (2013.01); *H04L 9/0631* (2013.01); *H04L 9/3066* (2013.01)

(58) Field of Classification Search
CPC ... H04L 9/0861; H04L 9/0894; H04L 9/0897; H04L 9/3234; H04L 9/3247; H04L 2209/043
See application file for complete search history.

(56) References Cited

U.S. PATENT DOCUMENTS

| | | | | |
|---|---|---|---|---|
| 7,103,180 B1 * | 9/2006 | McGregor, Jr. ....... | H04L 9/0625 |
| | | | | 380/28 |
| 10,341,098 B2 | 7/2019 | Bos et al. | |
| 2002/0129242 A1 * | 9/2002 | Abbott .................. | H04L 9/0894 |
| | | | | 713/157 |
| 2004/0172532 A1 * | 9/2004 | Silverbrook ............ | G06F 21/31 |
| | | | | 713/161 |
| 2007/0149280 A1 * | 6/2007 | LeMay ................... | G07F 17/32 |
| | | | | 463/29 |
| 2008/0229429 A1 * | 9/2008 | Krig ........................ | G06F 11/08 |
| | | | | 726/27 |
| 2014/0298032 A1 * | 10/2014 | Crowder, Jr. ......... | H04L 9/3247 |
| | | | | 713/176 |
| 2014/0325239 A1 * | 10/2014 | Ghose ................... | G06F 21/602 |
| | | | | 713/190 |

(Continued)

OTHER PUBLICATIONS

Lee et al., "Hybrid approach of parallel implementation on CPU-GPU for high?speed ECDSA verification," The Journal of Super-computing, Jan. 10, 2019, 21 pages.

(Continued)

*Primary Examiner* — Eric W Shepperd
(74) *Attorney, Agent, or Firm* — Kristofer Haggerty

(57) ABSTRACT

A computer-implemented method, according to one approach, includes: generating lookup tables for signatures during compile time, the lookup tables having cryptographic information. A secret key is used to encrypt the lookup tables, and the secret key is stored in a secure storage which is accessible only to a secure engine. Moreover, in response to experiencing an initial boot: the lookup tables are decrypted using the secret key, and the decrypted lookup tables are stored in the secure storage. Other systems, methods, and computer program products are described in additional approaches.

20 Claims, 8 Drawing Sheets

(56) References Cited

U.S. PATENT DOCUMENTS

| | | | | |
|---|---|---|---|---|
| 2017/0115963 A1* | 4/2017 | Stewart | ............... | G06F 8/71 |
| 2017/0262658 A1* | 9/2017 | Salmon-Legagneur | ............... | |
| | | | | H04L 9/3268 |
| 2020/0073657 A1* | 3/2020 | Robison | ............... | G06F 21/57 |
| 2021/0111901 A1* | 4/2021 | Ibrahim | ............... | G06F 21/72 |
| 2021/0216636 A1* | 7/2021 | Devries | ............... | G06F 8/63 |
| 2021/0406163 A1* | 12/2021 | Fox | ............... | G06F 21/6218 |
| 2022/0066845 A1* | 3/2022 | Lu | ............... | G06F 9/545 |
| 2023/0085577 A1 | 3/2023 | Lin | | |
| 2023/0169215 A1* | 6/2023 | Bowie | ............... | G06F 21/64 |
| | | | | 713/176 |
| 2024/0333497 A1* | 10/2024 | Khan | ............... | H04L 9/0877 |

OTHER PUBLICATIONS

Won et al., "A Secure Shuffling Mechanism for White-box Attack-resistant Unmanned Vehicles," IEEE Transactions on Mobile Computing, vol. 14, No. 8, Aug. 2017, pp. 1-17.
Zhou et al., "White-Box Implementation of ECDSA Based on the Cloud Plus Side Mode," Hindawi Security and Communication Networks, 2020, pp. 1-10.
Xue et al., "Efficient Multiplicative-to-Additive Function from Joye-Libert Cryptosystem and Its Application to Threshold ECDSA," Proceedings of the 2023 ACm SIGSAC Conference on Computer and Communications Security CCS'23, Nov. 2023, 16 pages, retrieved from https://eprint.iacr.org/2023/1312.

* cited by examiner

100

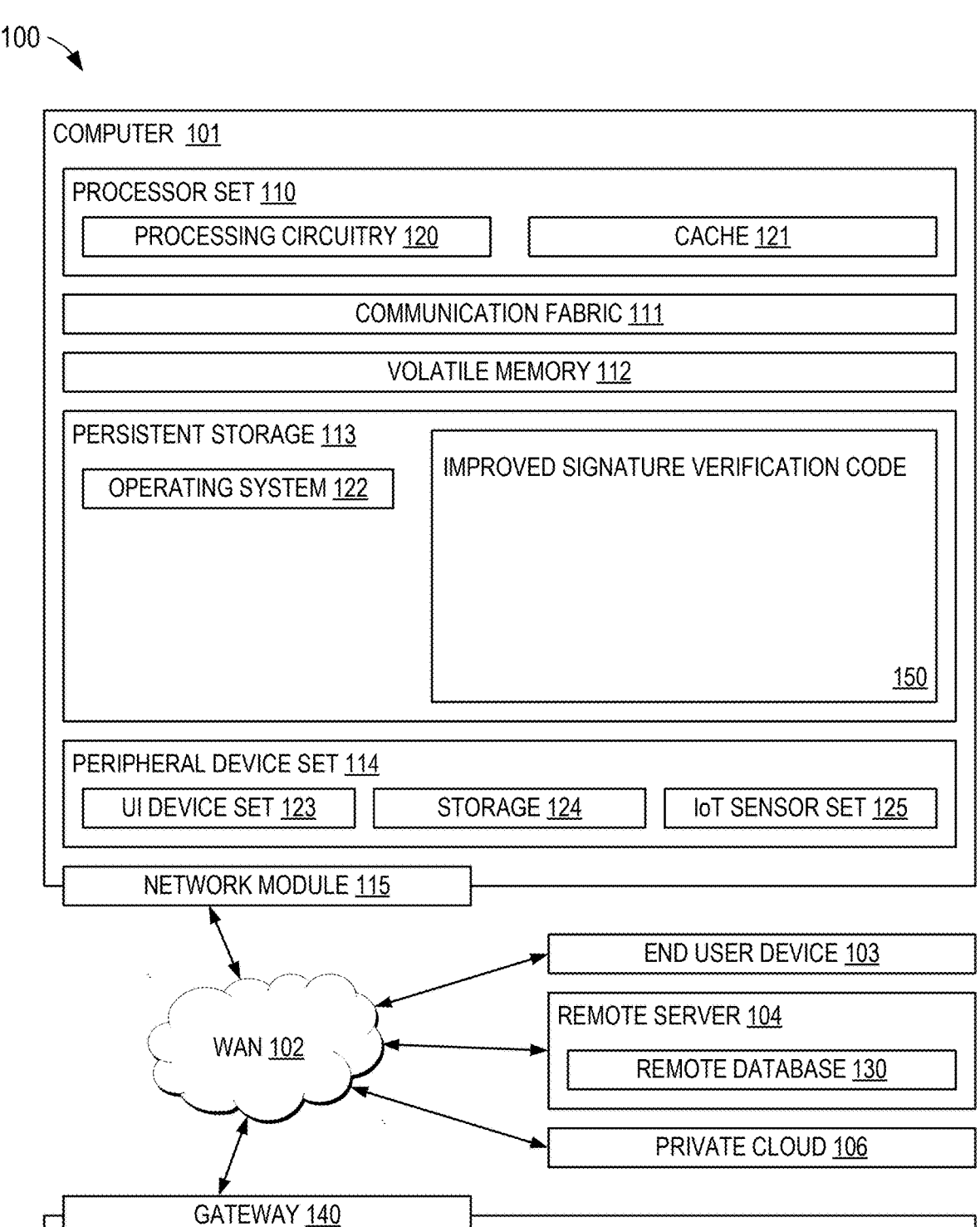

COMPUTER  101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

IMPROVED SIGNATURE VERIFICATION CODE

150

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

| 301 | 302 | 303 |
|---|---|---|

⋮

From operation
324

Decrypt the lookup tables
using the secret keys
received from the secure
storage

326

Use the decrypted lookup
tables to verify various
signatures in the secure
environment

328

Store decrypted lookup
tables locally in the
secure software
environment

330

350

Store decrypted lookup
tables locally in the
secure software
environment

352

To operation
354

⋮

REDUCING LATENCY DURING CRYPTOGRAPHIC SIGNATURE VERIFICATION

BACKGROUND

The present invention relates to data encryption, and more specifically, this invention relates to improving signature verification performance.

Data production has continued to increase, particularly as computing power and the use of Internet of Things (IoT) devices continue to advance. For instance, the rise of smart enterprise endpoints has led to large amounts of data being generated at remote locations. Data production will only further increase with the growth of $5^{th}$ Generation (5G) networks and an increased number of connected mobile devices.

This issue has also become more prevalent as the complexity of machine learning models increases. Increasingly complex machine learning models translate to more intense workloads and increased strain associated with applying the models to received data. The operation of conventional implementations has thereby been negatively impacted.

While cloud computing has been implemented in some conventional systems in an effort to improve the ability to process this increasing amount of data, moving sensitive workloads to the cloud exposes them to significant security risks. For example, the process of moving certain workloads to cloud for computation efficiency assumes (e.g., requires) the cloud to be secure. Cryptography allows for some security to be introduced to workloads and data that are exposed to public environments, but has also experienced an increase in processing overhead as a result of ever increasing amounts of processing that is requested on a regular basis.

SUMMARY

A computer-implemented method (CIM), according to one approach, includes: generating lookup tables for signatures during compile time, the lookup tables having cryptographic information. A secret key is used to encrypt the lookup tables, and the secret key is stored in a secure storage which is accessible only to a secure engine. Moreover, in response to experiencing an initial boot: the lookup tables are decrypted using the secret key, and the decrypted lookup tables are stored in the secure storage.

A computer program product (CPP), according to another approach, includes: a set of one or more computer-readable storage media, and program instructions. The program instructions are collectively stored in the set of one or more storage media, and are for causing a processor set to perform the foregoing CIM.

A computer system (CS), according to yet another approach, includes: a processor set, and a set of one or more computer-readable storage media. The CS also includes program instructions that are collectively stored in the set of one or more storage media, and which are for causing the processor set to perform the foregoing CIM.

Other aspects and implementations of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one approach.

DETAILED DESCRIPTION

Figure 2A:
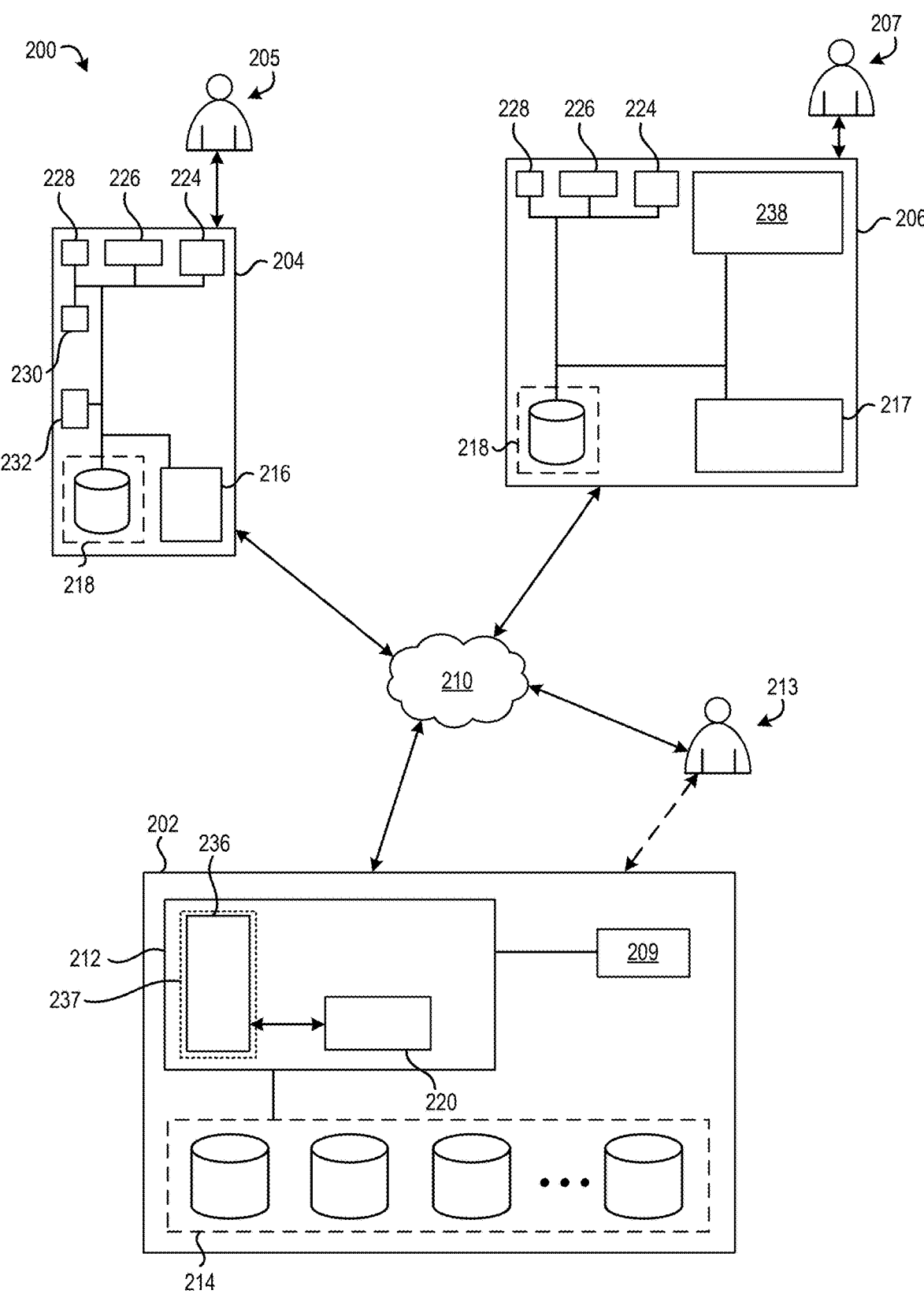
FIG. 2A is a representational view of a distributed system, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods, and computer program products for generating secure containers and lookup tables for each signature that is accessed. Thus, approaches herein are able to reduce compute latency experienced in response to verification requests. Approaches herein are also desirably able to improve latency by reducing data access times, and increasing throughput by pre-emptively decrypting and evaluating decrypted data, e.g., as will be described in further detail below.

In one general approach, a CIM includes: generating lookup tables for signatures during compile time, the lookup tables having cryptographic information. A secret key is used to encrypt the lookup tables, and the secret key is stored in a secure storage which is accessible only to a secure engine. Moreover, in response to experiencing an initial boot: the lookup tables are decrypted using the secret key, and the decrypted lookup tables are stored in the secure storage.

In another general approach, a CPP includes: a set of one or more computer-readable storage media, and program instructions. The program instructions are collectively stored in the set of one or more storage media, and are for causing a processor set to perform the foregoing CIM.

In yet another general approach, a CS includes: a processor set, and a set of one or more computer-readable storage media. The CS also includes program instructions that are collectively stored in the set of one or more storage media, and which are for causing the processor set to perform the foregoing CIM.

Various aspects of the present disclosure are described by narrative text, flowcharts, block diagrams of computer systems and/or block diagrams of the machine logic included in CPP approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product approach ("CPP approach" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved signature verification code at block 150 for generating secure containers and lookup tables for each signature that is accessed. Thus, approaches herein are able to reduce compute latency experienced in response to verification requests. Approaches herein are also desirably able to improve latency by reducing data access times, and increasing throughput by pre-emptively decrypting and evaluating decrypted data, e.g., as will be described in further detail below.

In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device. In other approaches (for example, approaches that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, Central Processing Unit (CPU) power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). It should also be noted that "services" or "microservices" may be used interchangeably with "applications" and "processes" herein. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some approaches, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of application program interfaces (APIs). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on-demand, and virtual private networks.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, Input/Output (I/O) interfaces, etc. By integrated with, what is meant is that the processor has logic embedded therewith as hardware logic, such as an application specific integrated circuit (ASIC), a Field Programmable Gate Array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various approaches.

As noted above, data production has continued to increase, particularly as computing power and the use of IoT devices continue to advance. For instance, the rise of smart enterprise endpoints has led to large amounts of data being generated at remote locations. Data production will only further increase with the growth of 5G networks and an increased number of connected mobile devices.

This issue has also become more prevalent as the complexity of machine learning models increases. Increasingly complex machine learning models translate to more intense workloads and increased strain associated with applying the models to received data. The operation of conventional implementations has thereby been negatively impacted.

While cloud computing has been implemented in some conventional systems in an effort to improve the ability to process this increasing amount of data, moving sensitive workloads to the cloud exposes them to significant security risks. For example, the process of moving certain workloads to cloud for computation efficiency assumes (e.g., requires) the cloud to be secure. Cryptography allows for some security to be introduced to workloads and data that are exposed to public environments, but has also experienced an increase in processing overhead as a result of ever increasing amounts of processing that is requested on a regular basis.

For example, the execution of cryptographic signature verification (e.g., such as Elliptic Curve Digital Signature Algorithm (ECDSA) signature verification) is a time consuming process that has caused conventional products to experience significantly increased latency during system boot time and other update periods. This delay only increases with number of signatures being verified as part of system boot flow. However, by generating secure containers and lookup tables for each signature that is accessed, approaches herein are able to reduce compute latency experienced in response to verification requests. Accordingly, approaches herein are desirably able to improve latency by reducing data access times, and increasing throughput by pre-emptively decrypting and evaluating decrypted data, e.g., as will be described in further detail below.

Looking now to FIG. 2A, a distributed data storage system 200 in accordance with one approach. As an option, the present system 200 may be implemented in conjunction with features from any other approach listed herein, such as those described with reference to the other FIGS. However, this distributed data storage system 200 and others presented herein may be used in various applications and/or in permutations which may or may not be specifically described in the illustrative approaches or implementations listed herein. Further, the system 200 presented herein may be used in any desired environment. Thus FIG. 2A (and the other FIGS.) may be deemed to include any possible permutation.

As shown, the distributed data storage system 200 includes a central server 202 that is connected to user device 204 and edge node 206. Specifically, the central server 202, user device 204, and edge node 206 are connected to a network 210 that allows for data (e.g., information, commands, requests, instructions, responses, encrypted data, etc.) to be sent between any of the locations 202, 204, 206.

The network 210 may be of any type, e.g., depending on the desired approach. For instance, in some approaches the network 210 is a WAN, e.g., such as the Internet. However, an illustrative list of other network types which network 210 may implement includes, but is not limited to, a LAN, a Public Switched Telephone Network (PSTN), a SAN, an internal telephone network, etc. As a result, any desired information, data, commands, instructions, responses, requests, etc. may be sent between the locations 202, 204, 206, regardless of the amount of separation which exists therebetween, e.g., despite being positioned at different geographical locations. It should also be noted that the different locations 202, 204, 206 may be connected to each other (and/or other locations) differently depending on the approach. According to an example, two host locations may be located relatively close to each other and connected by a wired connection, e.g., a cable, a fiber-optic link, a wire, etc.; etc., or any other type of connection which would be apparent to one skilled in the art after reading the present description.

With continued reference to FIG. 2A, the user device 204 and edge node 206 may have different configurations than the central server 202. For example, in some implementations the central server 202 includes a large (e.g., robust) processor 212 coupled to a cache 209 and memory 214 having a relatively high storage capacity. The central server 202 is thereby able to process and store a relatively large amount of data, allowing it to be connected to, and manage, multiple different remote locations. For example, edge node 206 may generate or receive cryptographic signatures that are stored and/or managed at a secure software environment of central server 202 (e.g., see FIGS. 2B-2D). The edge node 206 itself may also include a secure software environment in the controller 217 thereof in some approaches.

It should be noted that with respect to the present description, "data" may include any desired type of information. For instance, in different implementations data can include raw sensor data, metadata, program commands, instructions, etc. Moreover, while implementations herein are described in the context of encrypted data, this is in no way intended to be limiting. Data may also be protected with different types of security features depending on the approach. The way in which data is protected has an impact on how that data may be processed and/or stored. For instance, the processor 212 may use a secure software environment 236 to process incoming data that is encrypted. However, the secure software environment 236 may only be accessed by a secure engine 220. Accordingly, the processor 212 and/or the secure software environment 236 therein may be used to perform one or more operations in method 300 of FIG. 3A below.

With continued reference to FIG. 2A, the secure software environment 236 may be designed (e.g., custom built) to have certain characteristics and/or functionality. For instance, the secure software environment 236 may be used to process encrypted data received at the processor 212, as noted above. In some approaches, the secure software environment is a plugin-based software package that is modified by a host, and sent to central server 202 for implementation. For instance, the secure software environment may be modified to apply one or more encryption and/or decryption keys, add trusted (compliant) hashing algorithm details, etc.

As noted above, the secure software environment 236 is also preferably only accessible to the secure engine 220, and is inaccessible to a remainder of the processor 212. In other words, a logical boundary 237 may only be crossed by secure engine 220, and the logical boundary 237 prevents any other aspects of the processor 212 from accessing the secure software environment 236 or any data being processed therein. Software being run outside the logical boundary 237—other than any software running in the secure engine 220—is thereby unable to directly access any data being processed by software running in the secure software environment 236.

The ability to insulate the secure software environment 236 from exterior access effectively hides any data sent to and/or generated at the secure software environment 236. Thus, although the secure software environment 236 is located at the central server 202, it may implement confidential details without exposing them to the central server 202 and/or entities connected thereto, e.g., such as administrator 213. According to an example, the secure software environment 236 may include one or more private keys configured to encrypt and/or decrypt data according to an encryption standard. The secure software environment 236 may thereby be able to decrypt encrypted data and process (e.g., deduplicate and/or compress) the decrypted data without exposing any of the decrypted data and/or private key information to a remainder of the processor 212, e.g., as will be described in further detail below. Implementing the secure software environment 236 in the processor 212 thereby allows for increased storage capacity and reduced compute overhead, while also maintaining strict data security.

Figure 2B:
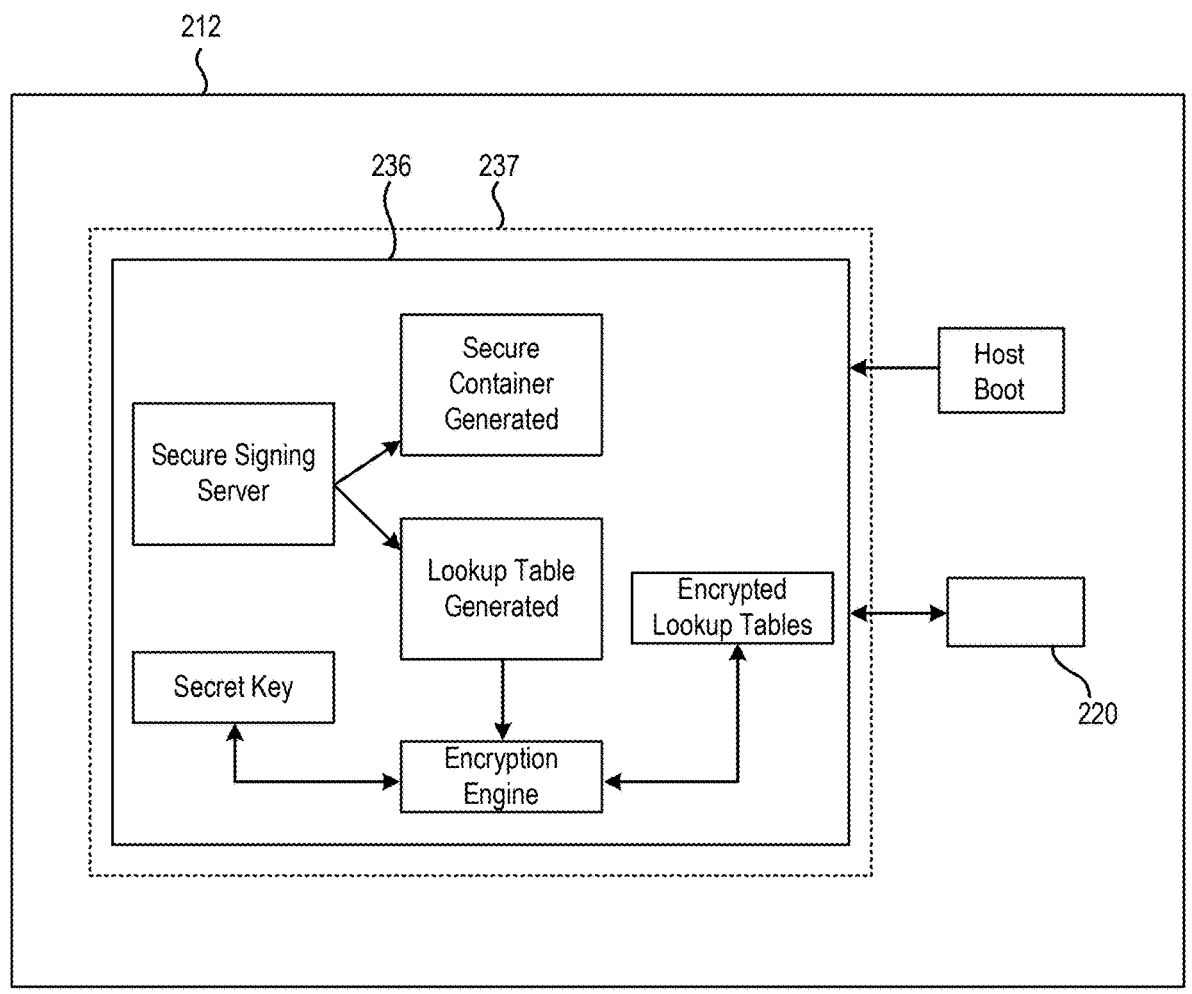
FIG. 2B is a more detailed view of components in the distributed system of FIG. 2A, in accordance with one approach.

Referring momentarily now to FIG. 2B, a more detailed view of the processor 212 and secure software environment 236 are shown in accordance with one approach. As an option, the present configuration may be implemented in conjunction with features from any other approach listed herein, such as those described with reference to the other FIGS.

As noted above, the secure software environment 236 is connected to a secure engine 220. Moreover, secure software environment 236 is only accessible to (e.g., by) the secure engine 220, and is therefore inaccessible to a remainder of the processor 212 and remaining system. In other words, a logical boundary 237 may only be crossed by secure engine 220, and the logical boundary 237 prevents any other aspects of the processor 212 from accessing the secure software environment 236 or any data being processed therein. It follows that in some approaches, secure engine 220 causes the secure software environment 236 to perform one or more operations, e.g., by sending one or more instructions thereto. Thus, software running inside the logical boundary 237 may communicate with the secure engine 220 during operation.

Looking specifically to the secure software environment 236, a Secure Signing Server generates a Secure Container and a Lookup Table for each cryptographic signature that is evaluated as a result of experiencing a Host Boot. Moreover, the Secure Container and Lookup Table are generated during compile time of the overarching system, e.g., rather than during run time after compile time has completed. This allows for the impact of the improvements achieved herein to be multiplied. Moreover, in situations where there are "n" signatures being verified, a corresponding "n" number of lookups will each be encrypted using the same secret key. Furthermore, the lookup table can be implemented as part of an update image package that may be easily transmitted to customers.

As noted above, the execution of cryptographic signature verification (e.g., such as Elliptic Curve Digital Signature Algorithm (ECDSA) signature verification) is a time consuming process that has caused conventional products to experience significantly increased latency during system boot time and other update periods. This delay only increases with number of signatures being verified as part of system boot flow. However, by generating secure containers and lookup tables for each signature accessed by the Secure Signing Server, approaches herein are able to reduce compute latency experienced in response to verification requests.

The secure container that is generated for each signature preferably includes a public key, a signature, and a corresponding message hash value. The information included in the secure container may be represented as a string of alphanumeric characters, alphanumeric characters separated into two or more groups, etc. Moreover, the public key, signature, and corresponding message hash value generated for the given signature are preferably stored in the Lookup Table Generated for the present signature. Again, by determining this information prior to it being requested, latency is significantly reduced.

The filled lookup tables are passed to the Encryption Engine where one or more encryption schemes may be applied to the data. As a result, the Encrypted Lookup Tables are produced in the secure software environment 236. While the Secret Key used to encrypt the Lookup Tables may be stored in the secure software environment 236. In other approaches, the Secret Key may be stored in secure (e.g., protected) storage. Furthermore, the Encrypted Lookup Tables may be stored in secure storage. For example, looking now to FIGS. 2C-2D, the central server 202 of FIG. 2A is shown at first and second respective phases of an in-use example, which is in no way intended to be limiting.

Figure 2C:
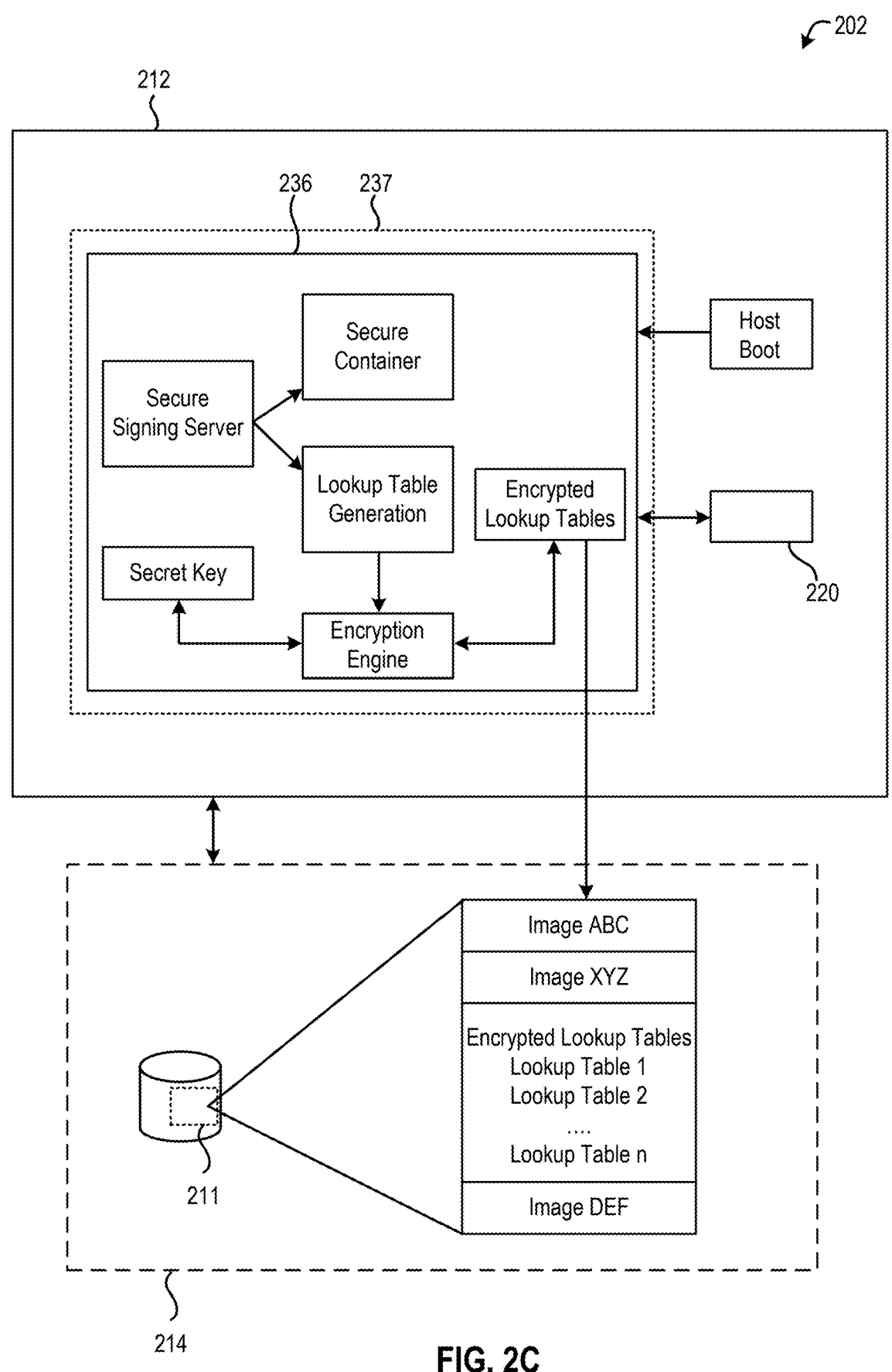
FIG. 2C is a representational view of components in the distributed system of FIG. 2A, in accordance with a first phase of an in-use example.

Looking specifically to FIG. 2C, the secure engine 220 has worked in combination with the secure software environment 236 and secure storage 211 in memory 214 (also referred to herein as "secure external storage") to store a number of encrypted lookup tables and corresponding images. As shown, any desired number of Encrypted Lookup Tables may be stored in the secure storage 211, along with a number of image packages Image ABC, Image XYZ, Image DEF. As noted above, each of the image packages may correspond to a respective lookup table generated by the Secure Signing Server. In other words, each image package that is generated also has a corresponding secure container and lookup table generated. The type of memory used to form the secure storage 211 may vary depending on the approach. For instance, the secure storage 211 may be located in serial electrically erasable programmable read-only memory (SEEPROM), non-volatile random access memory (NVRAM) e.g., such as Flash memory, hardened disks, parallel Not-OR (NOR) memory, etc., or any other desired type of memory.

Figure 2D:
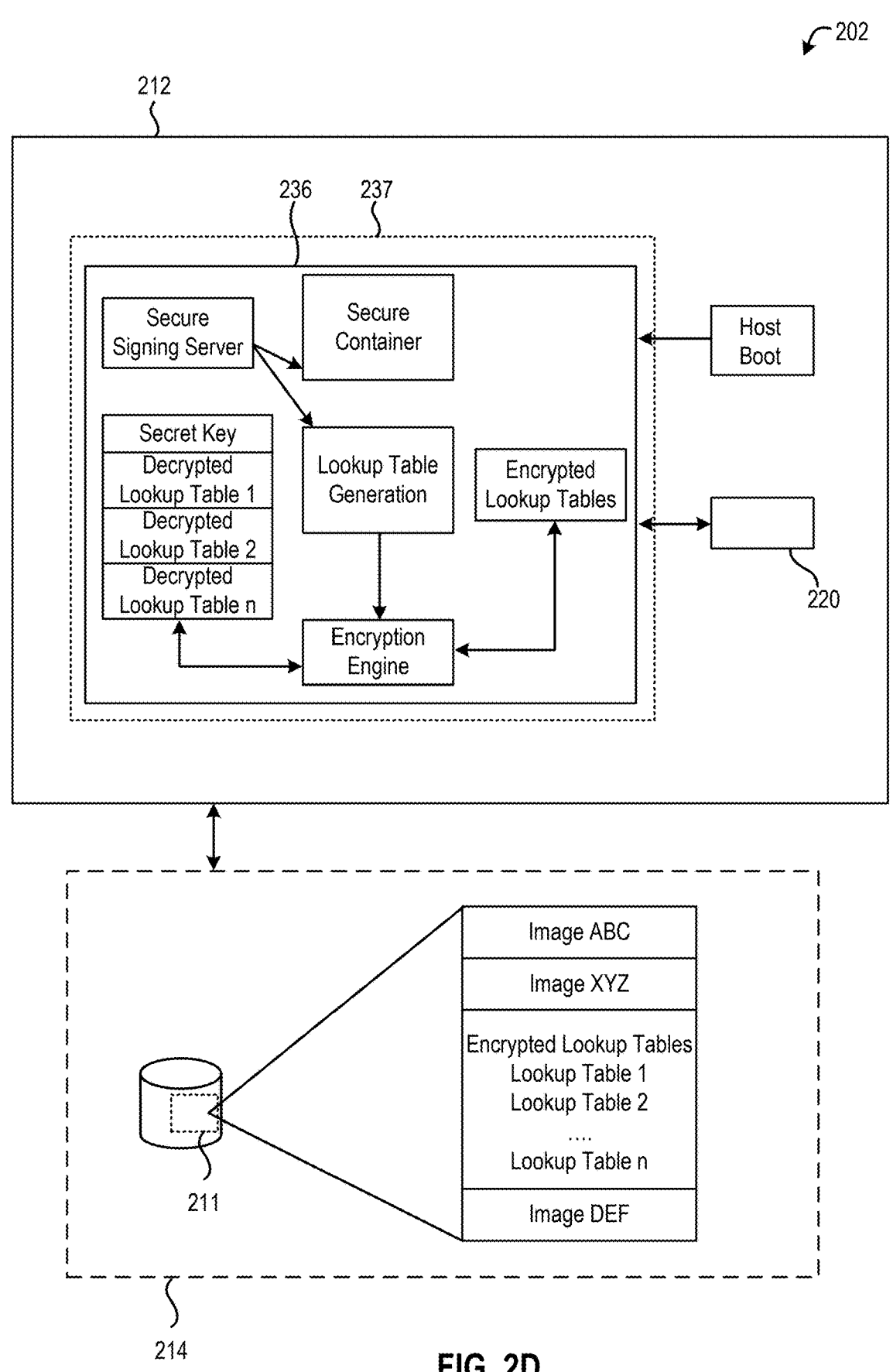
FIG. 2D is a representational view of components in the distributed system of FIG. 2A, in accordance with a second phase of an in-use example.

While FIG. 2C shows only the Secret Key stored in the secure software environment 236, lookup tables that have been decrypted may also be stored in the secure software environment 236. This reduces access times and increases efficiency of the system as a whole in response to requests that involve information in one or more of the decrypted lookup tables. Accordingly, FIG. 2D shows Decrypted Lookup Table 1,Decrypted Lookup Table 2, . . . , and Decrypted Lookup Table n stored along with the Secret Key, e.g., for easy access. In other words, the decrypted information may be more easily accessed from the local storage in the processor 212 rather than having to access the encrypted information stored in secure storage 211, and having to again decrypt the Encrypted Lookup Tables. However, the Secret Key may also be stored in secure storage.

Referring back now to FIG. 2A, user device 204 may be a mobile phone that includes a processor 216 coupled to memory 218. The processor 216 may receive inputs from, and interface with, user 205. For instance, the user 205 may input information using one or more of: a display screen 224, keys of a computer keyboard 226, a computer mouse 228, a microphone 230, and a camera 232. The processor 216 may thereby be configured to receive inputs (e.g., text, sounds, images, motion data, etc.) from any of these components as entered by the user 205. These inputs typically correspond to information presented on the display screen 224 while the entries were received. Moreover, the inputs received from the keyboard 226 and computer mouse 228 may impact the information shown on display screen 224, data stored in memory 218, information collected from the microphone 230 and/or camera 232, status of an operating system being implemented by processor 216, etc.

Looking to edge node 206, some of the components included therein may be the same or similar to those included in user device 204, and have therefore been given corresponding numbering. For instance, controller 217 is coupled to memory 218, a display screen 224, keys of a computer keyboard 226, and a computer mouse 228, which are accessible to administrator 207. Additionally, the controller 217 is coupled to an Artificial Intelligence (AI) module 238. The AI module 238 may include any desired number and/or type of AI-based models, e.g., such as machine learning models, deep learning models, neural networks, etc. Moreover, the models may be trained to perform certain procedures (e.g., identify patterns), e.g., as would be appreciated by one skilled in the art after reading the present description.

As a result, implementations herein are able to further improve latency by reducing data access times, and increasing throughput by pre-emptively decrypting and evaluating decrypted data. Looking now to FIG. 3A, a flowchart of a computer-implemented-method 300 for improving signature verification performance is illustrated in accordance with one approach. For example, method 300 may be implemented in approaches that apply ECDSA based security protocols to perform the signature verification.

The method 300 may be performed in accordance with the present invention in any of the environments depicted in FIGS. 1-2D, among others, in various approaches. Of course, more or less operations than those specifically described in FIG. 3A may be included in method 300, as would be understood by one of skill in the art upon reading the present descriptions. Each of the operations in method 300 may be performed by any suitable component of the operating environment. For example, the nodes 301, 302, 303 shown in the flowchart of method 300 may correspond to one or more processors positioned at a different location in a distributed system. Moreover, each of the one or more processors are preferably configured to communicate with each other.

In various approaches, the method 300 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As mentioned above, FIG. 3A includes different nodes 301, 302, 303, each of which represent one or more processors, controllers, computer, etc., positioned at a different location in a distributed system. For example, in some approaches one or more of the operations in method 300 may involve one or more components in a system having a secure engine that is connected to a secure software environment and protected area of memory, which may be connected to a central server as part of a larger distributed system. Accordingly, node 301 may include one or more processors which are located at secure engine in a processor at a central server of a distributed system (e.g., see secure engine 220 of FIGS. 2A-2D). Moreover, node 302 may include one or more processors which are located at a secure software environment (e.g., see secure software environment 236 of FIGS. 2A-2D. Furthermore, node 303 may include one or more processors which are located in memory, and which have access to a secure area in storage (e.g., see secure storage 211 in memory 214 of FIGS. 2C-2D).

Accordingly, commands, code, data, metadata outlining code updates, etc., may be sent between the nodes 301, 302, 303 depending on the approach. However, the secure software environment at node 302 may be configured such that it may only be accessed by the secure engine at node 301. Commands, code, data, metadata outlining code updates, etc., may not be sent between nodes 302 and 303 in some approaches. It should also be noted that the various processes included in method 300 are in no way intended to be limiting, e.g., as would be appreciated by one skilled in the art after reading the present description. For instance, data sent from node 302 to node 301 may be prefaced by a request sent from node 301 to node 302 in some approaches.

Looking to FIG. 3A, operation 304 includes initiating a system in response to experiencing a boot command. In other words, operation 304 includes supplying operating power to the system and components therein and causing software installed therein to run, in response to receiving a request to do so. The boot command (e.g., request) may be received from a user with access to the system (e.g., an administrator), an application running in a different system, automatically in response to a predetermined condition being met, etc.

In response to initiating the system at operation 304, the system enters compile time. It should be noted that as used herein, "compile time" is intended to refer to a period during software initialization during which programming code (e.g., such as C #, Java, C, Python, etc.) is converted into machine code (binary code). In contrast, "runtime" is intended to refer to a period during which programs are running. Accordingly, runtime typically occurs after compile time during operation, e.g., as would be appreciated by one skilled in the art after reading the present description. Thus, it should be emphasized that one or more of the operations in method 300 are performed during compile time, before the system is even able to complete the compile time and enter run time.

Thus, while in compile time 305, operation 306 includes generating a lookup table for each signature being evaluated. While operation 306 is performed at the secure software environment at node 302, this is in response to one or more instructions that may be sent from the secure engine at node 301. See operation 306'. Moreover, the lookup table (or at least lookup table entry) that is generated for a given signature at node 302 includes cryptographic information that corresponds to the respective signature. For example, an ECDSA lookup table generated in response to evaluating a given signature includes a public key, a signature, a message hash value, etc., each of which correspond to the given signature. Accordingly, operation 306 also includes generating a secure container for each signature. As noted above, a secure container includes cryptographic information that corresponds to the signature being evaluated (e.g., verified). For example, a secure container including a public key, a signature, a corresponding message hash value, etc., may be generated in operation 306 for each signature being verified. Moreover, the public key, message hash value, and signature may be represented as an alphanumeric string in some approaches, but the type and/or number of characters used to represent the cryptographic information in the secure container.

From operation 306, method 300 advances to operation 308. There, in response to receiving one or more instructions from node 301 in operation 308', operation 308 includes using a secret key to encrypt the lookup table. In some approaches, the secret key is designated by the secure engine. In other approaches, the secret key may be stored in a secure portion of memory (also referred to herein as "secure storage") at node 303. Thus, operation 308 may involve retrieving the secret key from node 303 in some approaches. In still other approaches, the secret key may be produced at the secure environment in response to receiving the one or more instructions from node 301.

In response to encrypting the lookup table, method advances from operation 308 to operation 310. There, operation 310 includes storing the secret key in secure storage at node 303. As noted above, secure storage includes protected areas in memory that may only be accessed in certain situations and/or by a specific component. For example, the secure storage may only be accessed by the secure engine at node 301 in some approaches. Moreover, operation 310 may also be initiated by one or more instructions sent that are initially sent from the secure engine at node 301. See operation 310'. In other approaches, the secret key may be sent to the service engine at node 301 before being transferred to the secure storage at node 303.

In addition to the secret key, the encrypted lookup table formed using the secret key may be transferred to secure storage in some approaches. For instance, operation 312' includes the secure engine at node 301 sending one or more instructions to the secure environment at node 302, these instructions ultimately causing the encrypted lookup table formed in operation 308 to be transferred to the secure storage at node 303. In other approaches, the encrypted lookup table may be sent to the service engine at node 301 before being transferred to the secure storage at node 303.

As noted above, operations of method 300 may be repeated for any cryptographic signature that is evaluated. For instance, operations 306, 308, 310, 312 may be repeated for each signature, e.g., in an iterative fashion. However, it should be noted that signatures evaluated (e.g., being verified) together may implement encryption using the same secret key. Thus, in situations where there are "n" signatures being verified, a corresponding "n" number of lookups will each be encrypted using the same secret key.

As a result, secure storage at node 303 is able to accumulate encrypted lookup tables and/or secret keys used to form the encrypted lookup tables as well as the cryptographic information stored therein. Moreover, by doing this during compile time, method 300 is able to reduce the amount of latency that is experienced while initiating a system. These improvements are also beneficial each time the system experiences a subsequent boot sequence, as well as each time a change occurs to one of the original signatures and/or the associated information.

Figure 3:
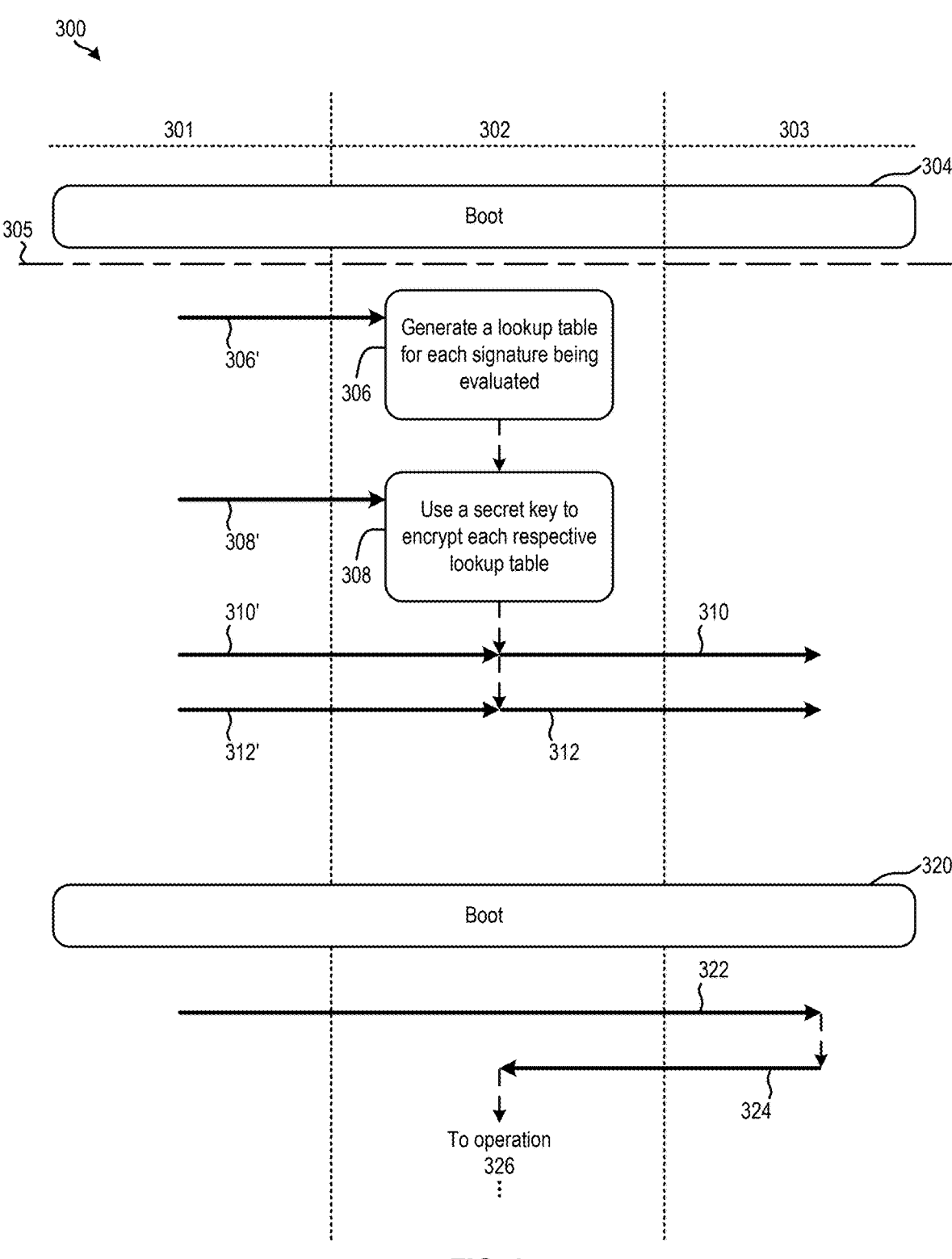
FIG. 3 is a flowchart of a method, in accordance with one approach.
Figure 3:
Figure 3:
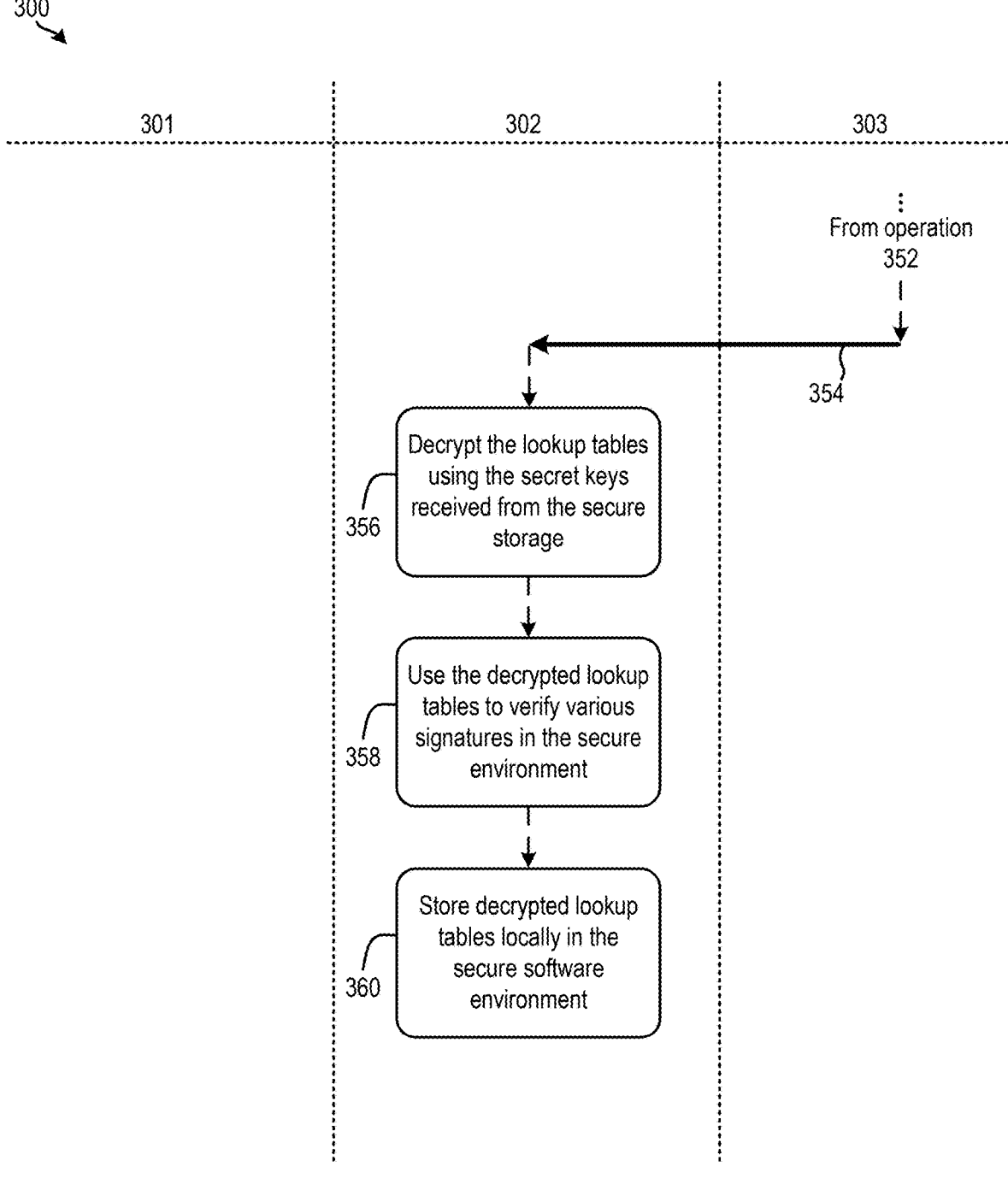

Accordingly, FIG. 3 also shows nodes 301, 302, 303 react to a subsequent boot command, as well as a change to one or more of the values stored in the encrypted lookup tables. Operation 320 includes receiving a boot command. In other words, operation 320 includes experiencing an initial boot. The initial boot may be triggered in response to the system recovering from a power loss, being turned on by a user, etc.

Proceeding to operation 322, the secure engine at node 301 issues a request to the secure storage at node 303 for one or more of the encrypted lookup tables. In some approaches, the issued request may include one or more secret keys that correspond to the requested encrypted lookup tables. The secure engine at node 301 may issue one or more instructions that ultimately cause the secure storage at node 303 to retrieve the requested encrypted lookup tables and/or secret keys. In some approaches, the information retrieved from secure storage at node 303 is sent directly to the secure environment at node 302. See operation 324. In other approaches, the information retrieved from secure storage at node 303 is first sent to the secure engine at node 301, and then transferred to the secure environment at node 302.

From operation 324, method 300 advances to operation 326. There, operation 326 includes decrypting the lookup tables using the secret key(s) received from the secure storage at node 303. In some approaches, an encryption engine in the secure software environment may use the received secret key(s) to decrypt the one or more received encrypted lookup tables. Depending on the type of encryption used to create the encrypted lookup tables, the decryption process may differ. For example, some approaches implement advanced encryption standard (AES) encryption and decryption. However, any desired type of encryption and/or decryption may be implemented.

In response to decrypting the lookup tables, the decrypted lookup tables may be used to verify various signatures in the secure environment. See operation 328. As noted above, boot procedures, updates to signature information, etc., may trigger the verification of cryptographic signatures. Accordingly, by decrypting the lookup tables, various cryptographic information predetermined as corresponding to the signatures being verified, may be easily accessed.

From operation 328, method 300 advances to operation 330, where the decrypted lookup tables are stored locally in the secure software environment at node 302. For instance, the secure software environment may include local memory that may only be accessed from within the secure software environment and/or by the control engine at node 301. This further reduces access times in situations where the lookup tables are requested again, e.g., as would be appreciated by one skilled in the art after reading the present description.

Looking now to operation 350, nodes 301, 302, 303 are shown as reacting to at least one of the values stored in the encrypted lookup table changing. For example, operation 350 may include receiving a code update that is currently being implemented. As shown, the code update is received by the secure engine at node 301. However, the code update may be received differently in other approaches. In some approaches, a code update may be received and/or generated directly at a secure software environment.

In response to receiving the code update at node 301, the secure engine at node 301 issues a request to the secure storage at node 303 for one or more of the encrypted lookup tables. See operation 352. In some approaches, the issued request may include one or more secret keys that correspond to the requested encrypted lookup tables. The secure engine at node 301 may issue one or more instructions that ultimately cause the secure storage at node 303 to retrieve the requested encrypted lookup tables and/or secret keys. In some approaches, the information retrieved from secure storage at node 303 is sent directly to the secure environment at node 302. See operation 354. In other approaches, the information retrieved from secure storage at node 303 is first sent to the secure engine at node 301, and then transferred to the secure environment at node 302.

From operation 354, method 300 advances to operation 356. There, operation 356 includes decrypting the lookup tables using the secret key(s) received from the secure storage at node 303. In some approaches, an encryption engine in the secure software environment may use the received secret key(s) to decrypt the one or more received encrypted lookup tables. Depending on the type of encryption used to create the encrypted lookup tables, the decryption process may differ. For example, some approaches implement advanced encryption standard (AES) encryption and decryption. However, any desired type of encryption and/or decryption may be implemented.

In response to decrypting the lookup tables, the decrypted lookup tables may be used to verify various signatures in the secure environment. See operation 358. As noted above, boot procedures, updates to signature information, etc., may trigger the verification of cryptographic signatures. Accordingly, by decrypting the lookup tables, various cryptographic information predetermined as corresponding to the signatures being verified, may be easily accessed.

From operation 358, method 300 advances to operation 360, where the decrypted lookup tables are stored locally in the secure software environment at node 302. As noted above, this further reduces access times in situations where the lookup tables are requested again, e.g., as would be appreciated by one skilled in the art after reading the present description.

It follows that method 300 is desirably able to improve latency by reducing data access times, and increasing throughput by pre-emptively decrypting and evaluating decrypted data. Again, as data production increases and it is more heavily relied on, processing overhead also increases. While conventional products have been forced to experience increased latency, approaches herein overcome these shortcomings. Approaches are able to generate lookup tables during compile time to accelerate access times. The lookup table generated during compile time by secure signing server is encrypted using a secret key. Accordingly, the lookup table can be part of update image package and can be easily shared to customers. However, the private key may only be accessible to the secure engine for decrypting the lookups, e.g., to verify an ECDSA based signature. This desirably ensures root of trust is not broken.

It should be noted that while decrypted data may be processed by the secure software environments described in the approaches herein, some data processing may be performed by utilizing the capabilities of other components. For instance, a deduplication agent may be used to deduplicate data that has been decrypted in a secure software environment (e.g., see secure software environment 236 in FIG. 2A). However, this deduplication is again preferably accomplished without exposing any of the decrypted data to the deduplication agent and/or a remainder of a storage controller. For instance, hash values may be used to perform the deduplication, thereby keeping the decrypted data secure (e.g., hidden).

Similarly, a compression accelerator may be used to compress data that has been decrypted in (e.g., by) a secure software environment. As noted above, this compression is preferably accomplished without exposing any of the decrypted data to the compression accelerator and/or a remainder of an overarching storage controller. For instance, the secure software environment may apply the compression accelerator to a virtual function to compress the decrypted data without actually sending the decrypted data directly to the compression accelerator, e.g., as would be appreciated by one skilled in the art after reading the present description.

According to further approaches, a secure software environment may expose an API, through which a secure engine (e.g., see secure engine 220 of FIG. 2A) can request that a given data block be compressed. In response to receiving this request through the API, the secure software environment may internally decrypt the data in the given data block using a set of private keys stored therein, and send the decrypted data to the compression accelerator to be compressed without exposing the decrypted data. The compression accelerator may thereby compress decrypted data to maintain security of the data. Thereafter, a compressed copy of the decrypted data is returned from the compression accelerator in the secure software environment. It follows that APIs can be used to accomplish a seamless interaction between opposite sides of a logical boundary while also maintaining security of encrypted data that is decrypted locally at the secure software environment. APIs may be used to help facilitate the movement and/or representation of data, the flow of a method, etc., as would be appreciated by one skilled in the art after reading the present description.

Logical boundaries thereby allow secure software environments to include copies of private keys without exposing them. The private keys may even be used to decrypt data in the secure software environment, such that the decrypted data may be deduplicated and/or compressed therein, without exposing the decrypted data. This desirably allows data storage systems to further improve storage capacity by reducing data storage utilization and increasing throughput by removing redundant data while maintaining data security.

It will be clear that the various features of the foregoing systems and/or methodologies may be combined in any way, creating a plurality of combinations from the descriptions presented above.

It will be further appreciated that implementations of the present invention may be provided in the form of a service deployed on behalf of a customer to offer service on demand.

The descriptions of the various implementations of the present invention have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical improvement over technologies found in the marketplace, or to enable others of ordinary skill in the art to understand the implementations disclosed herein.

What is claimed is:

1. A computer-implemented method (CIM), comprising:
generating, for signatures during compile time, lookup tables having cryptographic information;
using a secret key to encrypt the lookup tables;
storing the secret key in a secure storage which is accessible only to a secure engine; and
in response to experiencing an initial boot:
decrypting the encrypted lookup tables using the secret key, and
storing the decrypted lookup tables in the secure storage.

2. The CIM of claim 1, wherein the cryptographic information in each lookup table is selected from the group consisting of: public keys, signatures, and message hash values.

3. The CIM of claim 1, further comprising:
in response to one or more values stored in the encrypted lookup table tables changing:
accessing the encrypted lookup tables from external storage;
decrypting the encrypted lookup tables using the secret key; and
storing the decrypted lookup tables in the secure storage.

4. The CIM of claim 1, wherein the secure engine causes the method to be performed by sending one or more instructions to the secure storage.

5. The CIM of claim 1, further comprising:
generating, for each signature during compile time, a secure container having: a public key, a message hash value, and a signature.

6. The CIM of claim 1, wherein the signatures are Elliptic Curve Digital Signature Algorithm (ECDSA) based signatures.

7. The CIM of claim 6, wherein the encrypted lookup tables are encrypted using advanced encryption standard (AES) encryption.

8. The CIM of claim 1, further comprising:
storing the encrypted lookup tables in secure external storage.

9. The CIM of claim 8, wherein the secure external storage is selected from the group consisting of: serial electrically erasable programmable read-only memory, Flash memory, and parallel Not-OR (NOR) memory.

10. A computer program product (CPP), comprising:
a set of one or more computer-readable storage media; and
program instructions, collectively stored in the set of one or more storage media, for causing a processor set to perform the following computer operations:

generate, for signatures during compile time, lookup tables having cryptographic information;

use a secret key to encrypt the lookup tables;

store the secret key in a secure storage which is accessible only to a secure engine; and in response to experiencing an initial boot:

decrypt the encrypted lookup tables using the secret key, and store the decrypted lookup tables in the secure storage.

11. The CPP of claim 10, wherein the cryptographic information in each lookup table is selected from the group consisting of: public keys, signatures, and message hash values.

12. The CPP of claim 10, wherein the program instructions are for causing the processor set to further perform the following computer operations:

in response to one or more values stored in the encrypted lookup tables changing:

access the encrypted lookup tables from external storage;

decrypt the encrypted lookup tables using the secret key; and store the decrypted lookup tables in the secure storage.

13. The CPP of claim 10, wherein the secure engine causes the computer operations to be performed by sending one or more instructions to the secure storage.

14. The CPP of claim 10, wherein the program instructions are for causing the processor set to further perform the following computer operations:

generate, for each signature during compile time, a secure container having: a public key, a message hash value, and a signature.

15. The CPP of claim 10, wherein the signatures are Elliptic Curve Digital Signature Algorithm (ECDSA) based signatures.

16. The CPP of claim 15, wherein the encrypted lookup tables are encrypted using advanced encryption standard (AES) encryption.

17. The CPP of claim 10, wherein the program instructions are for causing the processor set to further perform the following computer operations:

store the encrypted lookup tables in secure external storage.

18. The CPP of claim 17, wherein the secure external storage is selected from the group consisting of: serial electrically erasable programmable read-only memory, Flash memory, and parallel NOR memory.

19. A computer system (CS), comprising:

a processor set;

a set of one or more computer-readable storage media;

program instructions, collectively stored in the set of one or more storage media, for causing the processor set to perform the following computer operations:

generate, for signatures during compile time, lookup tables having cryptographic information;

use a secret key to encrypt the lookup tables;

store the secret key in a secure storage which is accessible only to a secure engine; and in response to experiencing an initial boot:

decrypt the encrypted lookup tables using the secret key, and store the decrypted lookup tables in the secure storage.

20. The CS of claim 19, wherein the program instructions are for causing the processor set to further perform the following computer operations:

in response to one or more values stored in the encrypted lookup table tables changing:

access the encrypted lookup tables from external storage;

decrypt the encrypted lookup tables using the secret key; and store the decrypted lookup tables in the secure storage, wherein the secure engine causes the computer operations to be performed by sending one or more instructions to the secure storage.

* * * * *